(12) United States Patent
Kaltenbach et al.

(10) Patent No.: US 8,663,064 B2
(45) Date of Patent: Mar. 4, 2014

(54) METHOD FOR OPERATING A DRIVE TRAIN

(75) Inventors: Johannes Kaltenbach, Friedrichshafen (DE); Kai Borntrager, Langenargen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 305 days.

(21) Appl. No.: 13/266,624

(22) PCT Filed: May 19, 2010

(86) PCT No.: PCT/EP2010/056910
§ 371 (c)(1),
(2), (4) Date: Oct. 27, 2011

(87) PCT Pub. No.: WO2010/136366
PCT Pub. Date: Dec. 2, 2010

(65) Prior Publication Data
US 2012/0058857 A1    Mar. 8, 2012

(30) Foreign Application Priority Data
May 25, 2009   (DE) .......................... 10 2009 026 432

(51) Int. Cl.
*H02P 15/02*   (2006.01)
(52) U.S. Cl.
USPC .................... 477/9; 477/4; 477/184; 477/203
(58) Field of Classification Search
CPC ........ B60K 10/08; B60K 10/18; B60K 41/20; B60W 10/04; B60W 10/08; B60W 10/18; B60W 10/196; B60W 30/194
USPC ............................. 477/4, 9, 20, 182–184, 203
See application file for complete search history.

(56) References Cited

U.S. PATENT DOCUMENTS

| | | | |
|---|---|---|---|
| 4,538,553 A | 9/1985 | Kurz et al. | |
| 5,762,582 A * | 6/1998 | Friedrich et al. | 477/208 |
| 7,159,554 B2 | 1/2007 | Catalano | |
| 8,057,357 B2 * | 11/2011 | Kimura et al. | 477/98 |
| 2003/0109970 A1 * | 6/2003 | Nakamori et al. | 701/22 |
| 2009/0023548 A1 * | 1/2009 | Imamura et al. | 477/3 |
| 2012/0141297 A1 * | 6/2012 | Jeong et al. | 417/5 |

FOREIGN PATENT DOCUMENTS

| | | |
|---|---|---|
| DE | 33 01 560 C1 | 4/1984 |
| DE | 43 92 959 T1 | 9/1994 |
| DE | 199 34 621 A1 | 1/2001 |

(Continued)

*Primary Examiner* — Justin Holmes
(74) *Attorney, Agent, or Firm* — Davis & Bujold, PLLC; Michael J. Bujold

(57) ABSTRACT

A method of operating a drive-train of a motor vehicle which comprises a hybrid drive with a combustion engine and an electric machine, a clutch connected between the combustion engine and the electric machine, a transmission connected between the electric machine and a drive output, and either a primary retarder connected between the electric machine and the transmission or a secondary retarder connected between the transmission and the drive output. In order to warm up hydraulic oil, when the clutch between the combustion engine and the electric machine is disengaged and a transmission gear is engaged, a braking torque is produced by either the primary or secondary retarder, in the drive-train, and the electric machine is operated in a torque-controlled manner such that it delivers a torque equal to the sum of a target torque determined in accordance with the driver's wish and the braking torque produced by either the primary or secondary retarder.

8 Claims, 2 Drawing Sheets

(56) References Cited

FOREIGN PATENT DOCUMENTS

| DE | 103 42 893 A1 | 5/2005 |
| DE | 10 2004 057 125 A1 | 6/2006 |
| DE | 10 2006 012 847 A1 | 9/2007 |
| DE | 10 207 050 774 A1 | 4/2009 |
| EP | 1 671 834 A1 | 6/2006 |
| WO | 94/00323 A1 | 1/1994 |

* cited by examiner

METHOD FOR OPERATING A DRIVE TRAIN

This application is a National Stage completion of PCT/EP2010/056910 filed May 19, 2010, which claims priority from German patent application serial no. 10 2009 026 432.9 filed May 25, 2009.

FIELD OF THE INVENTION

The invention relates to a method for operating a drive train of a motor vehicle.

BACKGROUND OF THE INVENTION

The main components of a drive-train are a drive assembly and a transmission. The transmission converts rotational speeds and torques, and so transmits a traction force delivered by the drive assembly to a drive output of the drive-train. The present invention concerns a method for operating a drive-train with a drive assembly in the form of a hybrid drive, such that a clutch is connected between the internal combustion engine of the hybrid drive and the electric machine of the hybrid drive. A drive-train to be operated in accordance with the method according to the invention also comprises a primary retarder or a secondary retarder, a primary retarder being one that is connected between the electric machine of the hybrid drive and a transmission input of the transmission whereas a secondary retarder is connected between a transmission output of the transmission and the drive output of the drive-train.

To ensure proper operation of a drive-train, hydraulic oil, which is supplied to the transmission of the drive-train or to other assemblies thereof, must be at a minimum temperature. The present invention for operating a drive-train relates to details of how the hydraulic oil of such a drive-train can be warmed up rapidly to a minimum temperature.

From DE 103 42 893 A1 a method for warming up hydraulic oil in a transmission oil circuit is known, in which, to warm up the oil in the oil circuit, a power loss is produced whose heat is used to warm up the hydraulic oil.

From DE 199 34 621 B4 a circuit system of a retarder is known, with the help of which heated oil can be used immediately after the retarder to warm up transmission oil directly.

SUMMARY OF THE INVENTION

Starting from there, the present invention addresses the problem of providing a new type of method for operating a drive-train of a motor vehicle.

According to a first aspect of the invention to warm up hydraulic oil when the clutch connected between the internal combustion engine of the hybrid drive and the electric machine of the hybrid drive is disengaged and with a gear engaged in the transmission, a braking torque is produced by the primary retarder or by the secondary retarder in the drive-train, and the electric machine of the hybrid drive is operated in a torque-controlled manner such that the total torque it provides is the sum of a target torque determined in accordance with the driver's wish and the braking torque produced by the primary or secondary retarder.

According to a second aspect of the invention to warm up hydraulic oil when the clutch connected between the internal combustion engine of the hybrid drive and the electric machine of the hybrid drive is disengaged and when a neutral position of the transmission is engaged, a braking torque is produced by the primary retarder in the drive-train and the electric machine of the hybrid drive is operated in a rotational speed controlled manner such that it works in opposition to the braking torque of the primary retarder.

In accordance with the first aspect of the invention the method according to the invention can be used both in a drive-train with a primary retarder and in a drive-train with a secondary retarder.

In contrast, in accordance with the second aspect of the invention the method according to the invention can only be used in a drive-train with a primary retarder.

In both aspects of the present invention, the electric machine of the hybrid drive works in opposition to a braking torque produced by the retarder concerned. Accordingly electrical energy stored in an energy accumulator of the hybrid drive is converted into heat in order to warm up the hydraulic oil. To warm the hydraulic oil no additional structural elements such as heating rods are needed. With the method according to the invention hydraulic oil can be warmed up effectively, whereby the efficiency of the transmission and other assemblies of the drive-train to be supplied with hydraulic oil is improved. With the help of the method according to the invention it is also possible via a heat exchanger to warm up a cooling circuit of the internal combustion engine, in order in that way to operate the internal combustion engine in particular with higher efficiency and lower emissions, especially when starting it.

BRIEF DESCRIPTION OF THE DRAWINGS

Preferred further developments of the invention emerge from the subordinate claims and from the description given below. An example embodiment of the invention, to which it is not limited, is explained in more detail with reference to the drawing, which shows:

DETAILED DESCRIPTION OF THE PREFERRED EMBODIMENTS

Below, the present invention for operating a drive-train of a motor vehicle is described in detail with reference to FIGS. 1 to 4.

Figure 1:
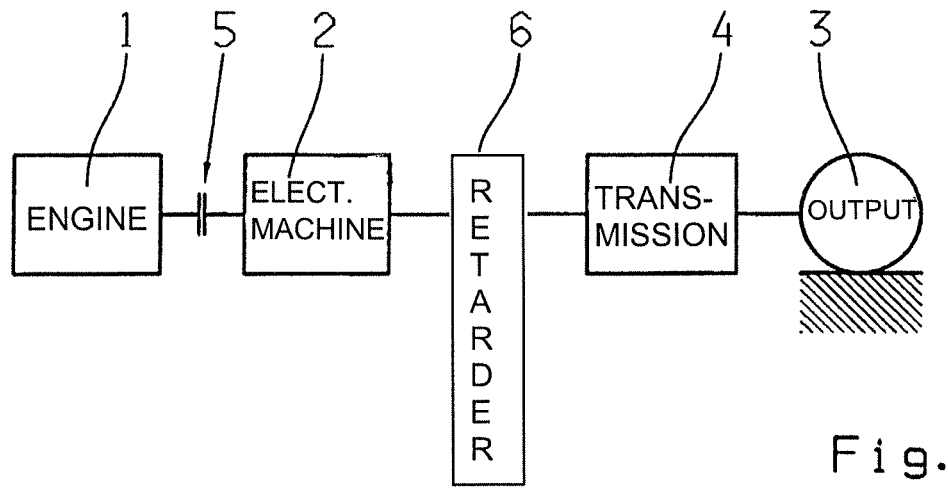
FIG. 1: A first drive-train layout of a motor vehicle, with which the method according to the invention can be used.
Figure 2:
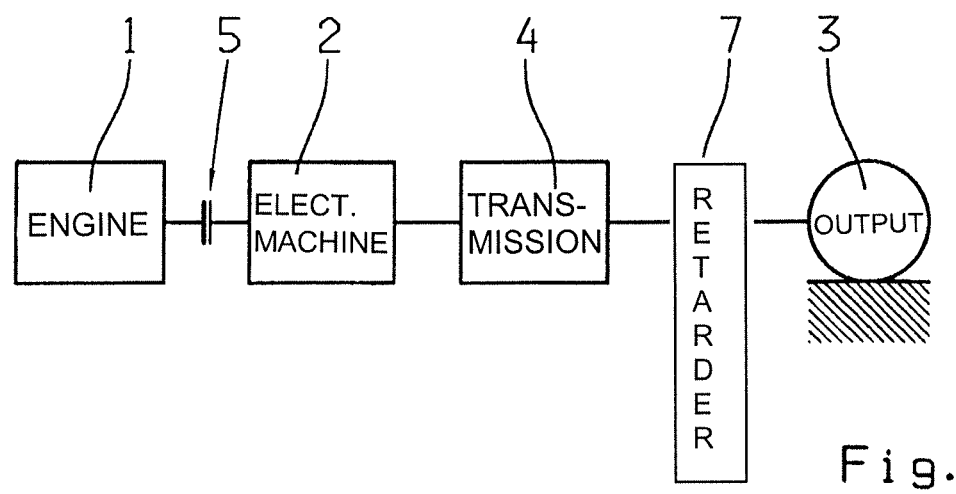
FIG. 2: A second drive-train layout of a motor vehicle, with which the method according to the invention can be used.

FIGS. 1 and 2 show very schematic representations of possible drive-trains with which the method according to the invention can be used. Thus, FIGS. 1 and 2 each show a drive-train with a hybrid drive comprising an internal combustion engine 1 and an electric machine 2. Between the hybrid drive formed by the internal combustion engine 1 and the electric machine 2 and a drive output 3 is connected a transmission 4, such that the transmission 4 transmits the traction force produced by the hybrid drive to the drive output 3. Between the internal combustion engine 1 of the hybrid drive and the electric machine 2 of the hybrid drive is connected a clutch 5, which is disengaged when the internal combustion engine 1 is decoupled from the drive output 3. In the example embodiment shown in FIG. 1 a retarder 6, also referred to as a primary retarder, is connected between the electric machine 2 and an input of the transmission 4. In the example embodiment shown in FIG. 2 a retarder 7, also called a secondary retarder, is connected between an output of the transmission 4 and the drive output 3. The drive-trains illustrated in FIGS. 1 and 2 are both parallel-hybrid drive-trains. In addition to the assemblies shown in FIGS. 1 and 2 the drive-trains comprise an electrical energy accumulator, and control assemblies.

The present invention now concerns a method for operating such drive-trains in order to effectively warm up hydraulic oil which, for example, is needed in the transmission 4 and/or in the internal combustion engine 1.

In a first method according to the invention hydraulic oil, which is needed in particular in the transmission 4 of the drive-train, is warmed up in that when the clutch 5 connected between the internal combustion engine 1 of the hybrid drive and the electric machine 2 of the hybrid drive is disengaged and when a gear is engaged in the transmission 4, a braking torque is produced by the primary retarder 6 or by the secondary retarder 7 in the drive-train and the electric machine 2 of the hybrid drive is operated in a torque-controlled manner such that it provides a torque equal in sum to a target torque determined in accordance with a driver's wish and the braking torque produced by the retarder 6 or 7 concerned. In this way the target torque determined in accordance with the driver's wish is provided at the drive output 3 and in addition the braking torque produced in the drive-train by the retarder 6 or 7 concerned is compensated by the electric machine 2 of the hybrid drive. The heat generated during this is used to warm up the hydraulic oil.

As already mentioned, the above method can be used both in a drive-train with a primary retarder 6 and in a drive-train with a secondary retarder 7, and also as already mentioned, the electric machine 2 is operated in a torque-controlled manner, this torque-controlled operation of the electric machine 2 of the hybrid drive being explained in detail with reference to FIG. 3.

Figure 3:
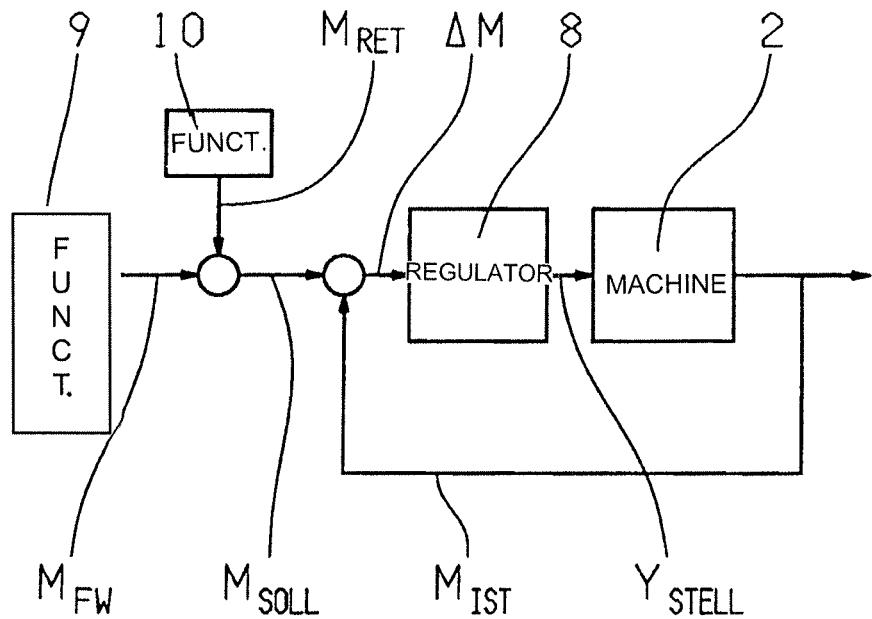
FIG. 3: A first block circuit diagram to make clear a first aspect of the invention.

Thus, FIG. 3 shows a control circuit for the torque-controlled operation of the electric machine 2 of the hybrid drive, such that with the help of a torque regulator 8 for the electric machine 2 of the hybrid drive a control output $Y_{STELL}$ is generated, which is transmitted to the electric machine 2 as an input quantity in order to operate the electric machine 2 in such manner that an actual torque $M_{IST}$ delivered by the electric machine is equal to a target torque $M_{SOLL}$.

The input quantity delivered by the torque regulator 8 is the control difference $\Delta M = M_{SOLL} - M_{IST}$ between the target torque $M_{SOLL}$ of the electric machine 2 and the actual torque $M_{IST}$ it is delivering. The electric machine 2 of the hybrid drive must provide on the one hand the target torque determined in accordance with the driver's wish and on the other hand the braking torque produced by the retarder 6 or 7 concerned, from which it follows that the target torque $M_{SOLL} = M_{FW} + M_{RET}$ for the torque regulator 8 is composed of a target torque $M_{FW}$ determined in accordance with the driver's wish and the braking torque $M_{RET}$ to be provided by the retarder concerned. The target torque $M_{FW}$ determined in accordance with the driver's wish is supplied in accordance with a driving strategy function 9. The braking torque $M_{RET}$ produced in the drive-train by the retarder 6 or 7 concerned is determined in accordance with a braking torque strategy function 10.

The braking torque of the retarder 6 or 7 concerned is determined in accordance with the braking strategy function 10 as a function of a hydraulic oil temperature or an external temperature and as a function of the electrical energy available in the electrical energy accumulator of the drive-train. In addition, the braking torque of the retarder 6 or 7 concerned is determined in such manner that the sum of it and the target torque determined in accordance with the driver's wish does not exceed a maximum torque which is the most that the electric machine 2 can deliver.

Alternatively, according to a second aspect of the invention, which can only be implemented in a drive-train that has a primary retarder 6 as in FIG. 1, hydraulic oil can be warmed up in that when the clutch 5 connected between the internal combustion engine 1 and the electric machine 2 of the hybrid drive is disengaged and when a neutral position is engaged in the transmission 4, a braking torque is produced in the drive-train by the primary retarder 6 and the electric machine 2 of the hybrid drive is operated in a rotational speed controlled manner such that it works in opposition to the braking torque of the primary retarder.

In this case the electric machine 2 of the hybrid drive then preferably produces a torque corresponding in value to the braking torque from the primary retarder 6, and the heat generated thereby is again used to warm up the hydraulic oil.

Figure 4:
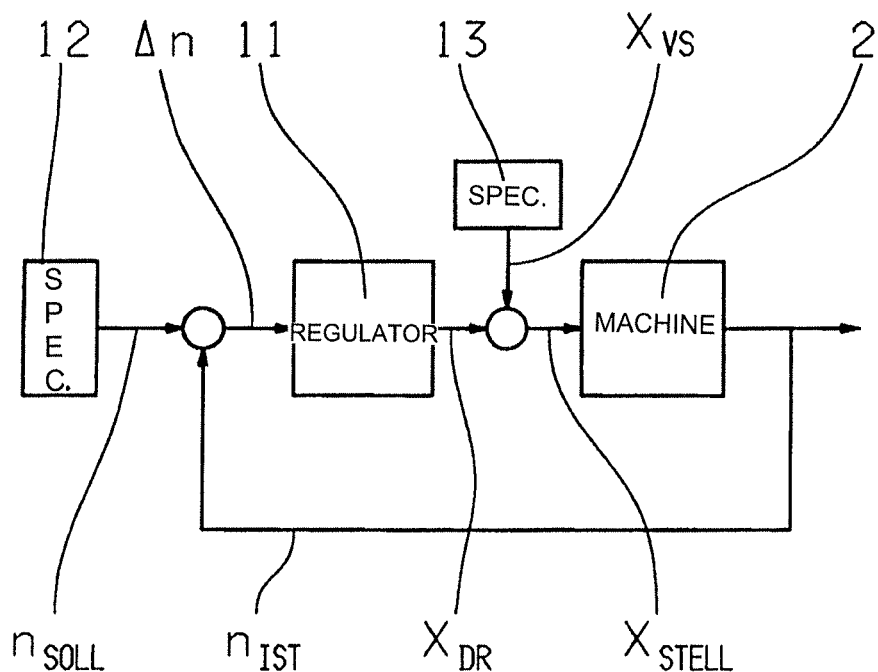
FIG. 4: A second block circuit diagram to make clear a second aspect of the invention.

FIG. 4 explains the rotational speed controlled operation of the electric machine 2 in accordance with this second aspect of the invention, with reference to a block diagram such that, with a rotational speed control system as in FIG. 4, the electric machine 2 of the hybrid drive is operated in a rotational speed controlled manner with the help of a rotational speed regulator 11. The input quantity transmitted to the rotational speed regulator 11, namely $\Delta n = n_{SOLL} - n_{IST}$, is the control difference between an actual rotation speed $n_{IST}$ of the electric machine 2 and a corresponding target rotational speed $n_{SOLL}$, and as a function of this control difference $\Delta n$ the rotational speed regulator 11 emits an initial output $X_{DR}$ on the basis of which a control quantity $X_{STELL}$ is transmitted to the electric machine 2 to regulate its rotational speed.

The target rotational speed $n_{SOLL}$ for the speed regulation system in FIG. 4 is determined with the help, of a target value specification 12 as a function of a hydraulic oil temperature or an external temperature and as a function of the electrical energy available in an electrical energy accumulator of the drive-train.

The braking torque to be produced by the primary retarder 6 in the drive-train, in opposition to which the electric machine 2 of the hybrid drive has to work, is also determined as a function of the hydraulic oil temperature or the external temperature and as a function of the electrical energy available in the energy accumulator, and the braking torque from the primary retarder 6 is determined in such manner that it does not exceed a maximum torque that can be produced by the electric machine 2.

Preferably, a quantity $X_{VS}$ that depends on the braking torque from the primary retarder 6 is superimposed as a pilot control component on the initial output $X_{BR}$ of the rotational speed regulator 11, in order to provide the control quantity $X_{STELL} = X_{DR} + X_{VS}$ for the electric machine 2 of the hybrid drive during its rotational speed controlled operation. For this, the pilot control component $X_{VS}$ is supplied with the help of a pilot control specification 13.

The two methods according to the invention have in common that an electric machine 2 of a hybrid drive works in opposition to a braking torque produced by a retarder in the drive-train in order to generate heat for warming up the hydraulic oil, namely by converting electrical energy into heat. Preferably, hydraulic oil for a transmission 4 is warmed up thereby. If a heat exchanger is used, it is also possible to warm up a cooling circuit of the internal combustion engine 1.

The invention is used when the hydraulic oil temperature or the external temperature are lower than a limit value. Above this limit value a drive-train can be operated in the conventional manner since it is then not necessary to warm up the hydraulic oil.

INDEXES

1 Internal combustion engine
2 Electric machine
3 Drive output
4 Transmission
5 Clutch
6 Retarder
7 Retarder
8 Rotation speed regulator
9 Driving strategy function
10 Braking torque strategy function
11 Rotation speed regulator
12 Target value specification
13 Pilot control specification

The invention claimed is:

1. A method of operating a drive-train of a motor vehicle in which the drive-train comprises a hybrid drive with an internal combustion engine and an electric machine, a clutch that is connected between the internal combustion engine and the electric machine of the hybrid drive, a transmission connected between the electric machine of the hybrid drive and a drive output of the drive-train, and either a primary retarder connected between the electric machine of the hybrid drive and the transmission or a secondary retarder connected between the transmission and the drive output for warming up hydraulic oil when the clutch, connected between the internal combustion engine and the electric machine of the hybrid drive, is disengaged and a gear is engaged in the transmission, the method comprising the steps of:
producing a braking torque in the drive-train by the primary retarder or the secondary retarder; and
operating the electric machine of the hybrid drive in a torque-controlled manner such that the electric machine delivers a torque equal to a sum of a target torque, determined in accordance with a driver's wish, and the braking torque produced by the primary retarder or the secondary retarder.

2. The method according to claim 1, further comprising the step of determining the braking torque produced by the primary retarder or the secondary retarder as a function of one of:
a hydraulic oil temperature and an external temperature, and
an amount of electrical energy available in an electrical energy accumulator.

3. The method according to claim 1, further comprising the step of determining the braking torque produced by the primary retarder or the secondary retarder in such a manner that a sum of the braking torque produced and the target torque, determined as a function of the driver's wish, does not exceed a permissible maximum torque of the electric machine.

4. A method for operating a drive-train of a motor vehicle in which the drive-train comprises a hybrid drive with an internal combustion engine and an electric machine, a clutch connected between the internal combustion engine and the electric machine of the hybrid drive, a transmission connected between the electric machine of the hybrid drive and a drive output of the drive-train, and a primary retarder connected between the electric machine of the hybrid drive and the transmission for warming up hydraulic oil when the clutch, connected between the internal combustion engine and the electric machine, is disengaged and a neutral position is engaged in the transmission, the method comprising the steps of:
producing a braking torque with the primary retarder in the drive-train; and
operating the electric machine of the hybrid drive in a rotational speed controlled manner such that the electric machine works in opposition to the braking torque produced by the primary retarder.

5. The method according to claim 4, further comprising the step of operating the electric machine of the hybrid drive in a rotational speed controlled manner such that the electric machine produces a torque equal to the braking torque produced with the primary retarder.

6. The method according to claim 5, further comprising the step of determining a target rotational speed as a function of:
one of a hydraulic oil temperature and an external temperature, and
an amount of electrical energy available in an electrical energy accumulator.

7. The method according to claim 6, further comprising the step of superimposing a quantity that depends on the braking torque, produced by the primary retarder, on an output quantity of the rotational speed control system as a pilot control component.

8. A method of operating a drive-train of a motor vehicle for warming up hydraulic oil in which the drive-train comprises a hybrid drive with an internal combustion engine and an electric machine, a clutch connected between the internal combustion engine and the electric machine, a transmission connected between the electric machine and a drive output of the drive-train, and retarder connected one of between the electric machine of the hybrid drive and the transmission and between the transmission and the drive output, the method comprising the steps of:
disengaging the clutch connected between the internal combustion engine and the electric machine;
engaging a gear in the transmission;
producing a braking torque with the retarder;
generating heat by operating the electric machine in a torque-controlled manner such that the electric machine outputs an actual torque that is equal to a sum of a target torque, which is dependant on a driver's wish, and the braking torque produced by the retarder; and
warming the hydraulic oil with the heat generated by operating the electric machine in the torque-controlled manner.

* * * * *